May 11, 1965  J. P. RANDOLPH, JR., ET AL  3,182,930
MISSILE IN FLIGHT INDICATOR
Filed Oct. 10, 1956  2 Sheets-Sheet 1

INVENTORS
JOSEPH P. RANDOLPH, JR
HENRY B. RIBLET
JOHN W. HAMBLEN
BY
ATTORNEYS

May 11, 1965    J. P. RANDOLPH, JR., ET AL    3,182,930
MISSILE IN FLIGHT INDICATOR
Filed Oct. 10, 1956    2 Sheets-Sheet 2

DECODER INPUT PULSES

1 μ SEC / DIVISION

DECODER OUTPUT PULSES

1 μ SEC / DIVISION

INVENTORS
JOSEPH P. RANDOLPH, JR.
HENRY B. RIBLET
JOHN W. HAMBLEN
BY
ATTORNEYS

United States Patent Office 3,182,930
Patented May 11, 1965

3,182,930
MISSILE IN FLIGHT INDICATOR
Joseph P. Randolph, Jr., Silver Spring, Henry B. Riblet, Kensington, and John W. Hamblen, Silver Spring, Md., assignors to the United States of America as represented by the Secretary of the Navy
Filed Oct. 10, 1956, Ser. No. 615,209
8 Claims. (Cl. 244—14)

The present invention relates to a missile in flight indicator. More specifically, the invention relates to an apparatus which will provide continuous information concerning the status of each guided missile in the radar beam of a beam rider guidance system.

One of the primary advantages gained by the use of beam rider guidance systems is that a number of missiles can follow the same radar guidance beam simultaneously. In order to utilize this advantage to the fullest extent, it is necessary for a fire control officer to have a continuous indication of the number of missiles in the beam at a given time and the range to each missile and to a target. With this information clearly displayed, the fire control officer will know when to fire another round in the event a preceding missile leaves the beam before it reaches the target, or passes the target without detonation.

It is therefore an object of this invention to provide an indication system that will permit the full utilization of a radar guidance beam. More particularly, the principal object of the invention is to provide an indication of (a) the number of missiles, if any, in the beam, and (b) the range to each missile and to the target.

Figure 1:
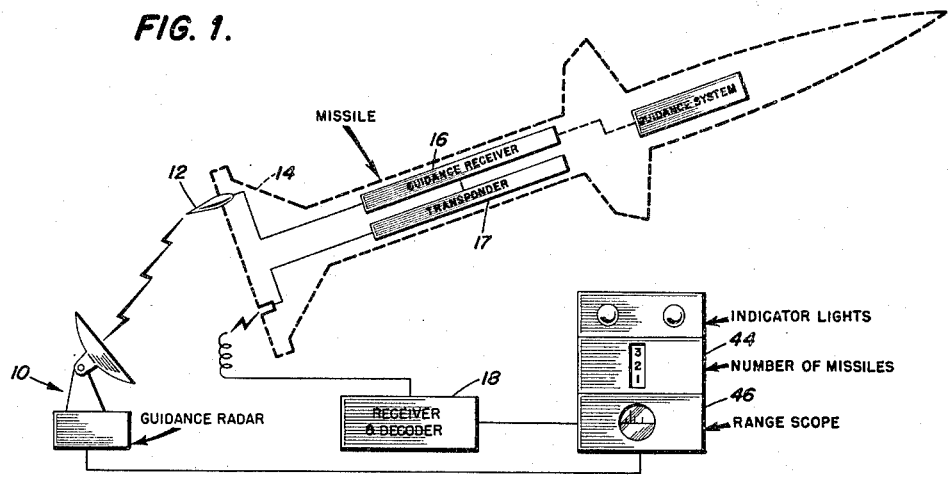
Figure 2:
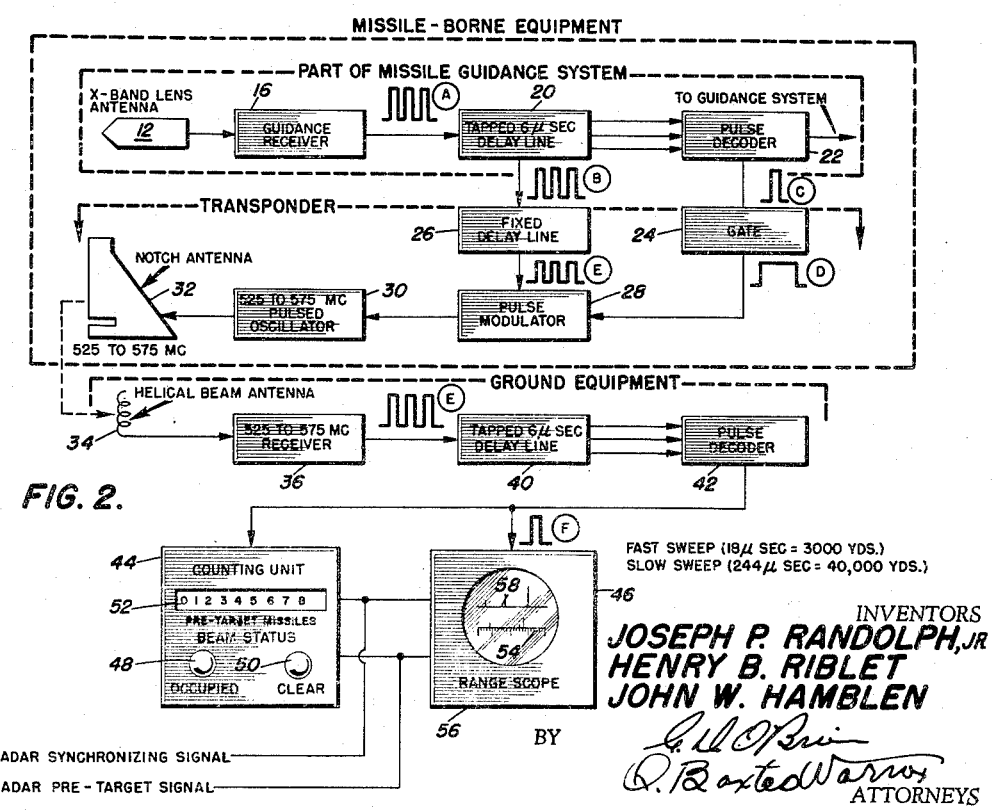
Figure 3:
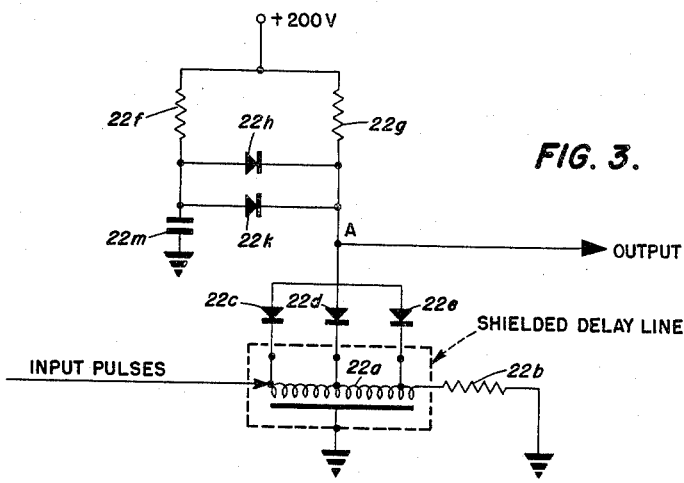
Figure 4:
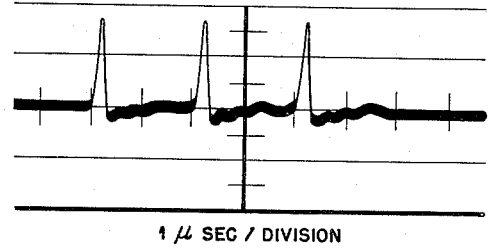
Figure 5:
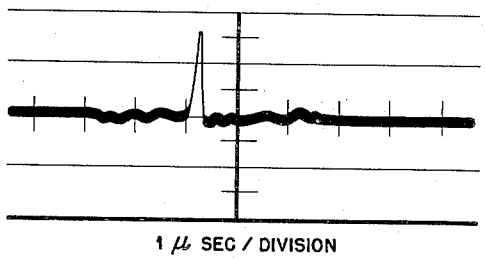

Other objects and many of the attendant advantages of this invention will be readily appreciated as the same becomes better understood by reference to the following detailed description when considered in connection with the accompanying drawings, wherein:

FIG. 1 is a diagrammatic illustration of the present invention;
FIG. 2 is a block diagram;
FIG. 3 is a circuit diagram of the decoders employed;
FIG. 4 is a graphic representation of a group of decoder output pulses; and
FIG. 5 is a chart showing the output pulse obtained from the decoder.

Briefly, as shown in FIG. 1, the indicator system of the invention consists of airborne and ground equipment. The airborne equipment in each missile receives a signal from a guidance radar via the guidance receiver in the missile, and retransmits it by a transponder, also in the missile, to special ground equipment including a receiver and decoder. The signals from all the missiles are displayed on a counter connected with the decoder as the number of missiles in the radar beam at a given time. The signals are also displayed on a rangescope, connected with the counter, which shows the range to each missile and to the target.

In the following description it has not been deemed necessary to describe in detail all of the components and the circuits utilized in the invention, because most of said components and circuits are well-known in the missile art. Moreover, substitutions and alterations can be made in them without departing from the basic principles involved. A brief description of the decoder employed has been incorporated, however.

In detail, a guidance radar 10 transmits a signal to a missile in the form of a triple pulse guidance code. The signal is received by a lens antenna 12 on the missile fin 14, and fed to the guidance receiver 16 which is part of the missile guidance system. As shown in FIG. 2, the triple pulse modulation appears at the output of guidance receiver 16 and is supplied to the transponder 17, which is also part of the missile-borne equipment, at two points. Waveform "B," the triple pulse guidance code, appears at the output of a 6 microsecond delay line 20 in the guidance system. This differs from waveform "A," appearing at the output of the receiver 16, only in that it is delayed in time 6 microseconds by said delay line 20 and is reduced in amplitude. The tapped delay line 20 comprises a suitable number of inductance-capacitance combinations, or other transmission elements, to operate a pulse decoder 22, to be described in more detail hereinafter. Waveform "C" is obtained from the pulse decoder 22 and is in the form of a single 0.25 microsecond pulse which coincides in time with the first pulse of waveform "B" to arrive at the end of the delay line 20. This triggers a gate circuit 24 comprising a blocking oscillator to provide a gate of nominal 7-microsecond width. This waveform, a stretched pulse shown at "D," gates a pulse modulator 28 "on," and allows it to be triggered by the triple pulse waveform "E" which has been delayed for a fixed time, by delay line 26, so that it arrives at the pulse modulator during the "gate-on" time. The pulse modulator 28 consists of a controlled blocking oscillator which generates a 0.25 microsecond pulse for each pulse of the guidance code passing through the gate. Thus the pulse modulator 28 provides a triple pulse output of waveform "E" which in turn pulses an oscillator 30 which retransmits the same triple pulse code by a notch excited antenna 32 on the missile tail. A notch excited antenna is shown and described in patent application Serial No. 86,361, filed April 8, 1949, Ralph O. Robinson, inventor.

The decoder 22 is shown in detail in FIG. 3 and receives pulses, in groups of three, from the delay line 20. The decoder includes a tapped delay line 22a which is terminated, at 22b, in its characteristic impedance so that input pulses are not reflected from the end of said line. With no imput pulses, the D.C. path from point A to ground includes diodes 22c, 22d and 22e, said delay line 22a and the termination 22b.

The first positive pulse applied to the input of delay line will bias diode 22c to cutoff, leaving diodes 22d and 22e as conducting paths from point A to ground. The first pulse will be transmitted down the delay line 22a and will arrive at the first tap a predetermined time later, the time depending upon the pulse spacing, for causing the diode 22d to cease conduction; subsequently the pulse will reach the diode 22e for causing it to cease conduction. Conduction will be restored following passage of the first pulse, however, the second and third pulses will reach the diodes 22c and 22d when the first pulse reaches the second tap, with the result that all of the diodes will be biased to cutoff. With no conducting path from point "A" to ground, the stray capacity from point "A" to ground will be charged from the +200 v. supply through the circuit shown. The voltage from point "A" to ground will rise to the amplitude of the input pulses (approximately 6 volts), at which time the diodes 22c, 22d and 22e will conduct again. The output of the decoder will then consist of one pulse for each group of correctly coded pulses at the input. It will be apparent that when the first pulse of a group enters the delay line, and when the second and third pulses pass tap No. 2, (or whenever pulses of any incorrectly coded group arrive at these points), there will be two conducting diodes from point "A" to ground. The small change in the resistance of the conducting paths from point "A" to ground at these times will result in the generation of pulses at point "A," of very small amplitudes. A circuit, consisting of resistors $22f$ and $22g$, diodes $22h$ and $22k$ and capacitor $22m$, will eliminate these undesired pulses at the output of the decoder. For further details on the operation of a decoder circuit, see Proceedings of the I.R.E., May 1950, "Diode Coincidence and Mixing Circuits in Digital Computers," by Tung Chang Chen.

Since it is assumed that there may be a large number, say twenty or more, different radars in a given area employing a similar number of guidance codes, it is necessary to code the missile reply signals to avoid confusion with the replies of missiles in other beams. The missile in flight indicator employs the same code as that employed by the guidance system for a given radar.

At the ground station, the triple pulse code is detected by a helical beam antenna 34 and fed to a pulse receiver 36. Since all of the missiles in the assumed twenty or more radar beams will transmit their various codes at the same frequency, the ground equipment must include some decoding means. Therefore the recovered signal of waveform "E" is fed to a tapped 6 micro-second delay line and decoder, 40 and 42, respectively, which are identical to those in the missile. The output from the decoder consists of a train of single pulses "F" (one pulse per missile for each radar repetition period). This output is fed, together with the radar synchronizing signal and the radar pre-target signal, to a counting unit 44 and a rangescope 46.

The counting unit includes red and green beam status lights 48 and 50 which are operated by a relay (not shown) energized by the stretched output of the decoder. When there is at least one missile between the launcher and the target, the relay is energized and red light 48 indicates that the beam is occupied. When the last missile has passed the target, there is no longer any output from the decoder; therefore, the relay is deenergized, red light 48 is extinguished and green light 50 is energized, indicating that the beam is clear.

The count of missiles between the launcher and the target is indicated by an illuminated number on a counter scale 52. The counter is gated "on" by a radar synchronizing pulse corresponding to the beginning of the radar repetition period, and counts the output pulses from the decoder (one pulse per missile in the beam) until it is gated "off" by another radar signal corresponding to the target pulse. The count is completed in 600 microseconds or less and is displayed for ten radar repetition periods, after which the counter is reset and a new count is made and displayed. This display period is made longer than the counting period so that the number indicating the final count is brighter than the intermediate numbers. The counting process is repeated approximately 135 times per second; therefore, there is no apparent flicker in the presentation and the count is continuous for all practical purposes.

A typical rangescope display with two missiles in the beam is illustrated in the block diagram in FIG. 2. The slow sweep 54 (244 microseconds=40,000 yd.) on the lower part of the rangescope 56 contains range markers at 2000-yard intervals. The missile pips indicate the range to each missile. The target pip (supplied from the radar) is shown on the same range scale.

The fast sweep 58 (18 microseconds=3000 yd.) appears above the slow sweep on the rangescope and is initiated at a fixed time ahead of the target pip, regardless of the target position. The target pip remains stationary on the fast sweep, but the missile reply signals (when the missile is sufficiently close to the target) appear as moving pips. The amount of separation between the target and missile pips is a measure of the distance between the target and the missile. No range markers are employed on the fast sweep. Missiles which have passed the target, although not indicated by the counting unit, will be displayed on both fast and slow sweeps.

Obviously many modifications and variations of the present invention are possible in the light of the above teachings. It is therefore to be understood that within the scope of the appended claims the invention may be practiced otherwise than as specifically described.

What is claimed is:

1. A missile in flight indicator for beam riding missiles comprising, means including a guidance radar for transmitting a guidance code comprising pulse groups, means on each missile for receiving and decoding the pulse guidance code, means also on each missile for retransmitting the guidance code at a different frequency, means remote from the missiles for receiving the retransmitted code from a number of missiles, means connected to the last-mentioned means for decoding the retransmitted code, counting and range indicating units connected to the decoding means, and means for supplying target information from the guidance radar to the counting and range indicating units, whereby a visual indication may be provided of the number of missiles in a beam and the distance from each missile to the target.

2. A missile in flight indicator comprising a guidance radar transmitting a guidance code consisting of pulse groups, means on each missile for receiving and decoding the guidance code, means also on each missile for retransmitting the guidance code, means remote from the missiles for receiving the retransmitted code from a plurality of missiles in the beam, means connected to the last-mentioned means for decoding the retransmitted code, and counting and range indicating units connected to the decoding means and to the radar whereby a visual indication may be provided of the number of missiles in the beam and the distance from each missile to the target.

3. In combination with a radar projecting a guidance beam including coded pulse groups, and at least one missile traveling the beam, a missile in flight indicator comprising a receiver in each missile, an antenna connected with the receiver and receiving energy from the guidance beam, a transponder connected with the receiver, a second antenna on each missile and connected with the transponder, and apparatus remote from each missile and including a second receiver, a delay line connected to the receiver, a pulse decoder connected to the delay line, a counting unit and range indicator means, said counting unit and range indicator means being connected to the pulse decoder, and means feeding synchronizing and target echo signals from the radar to the counting unit and range indicator means, said counting unit indicating the number of missiles in the beam and said range indicator unit indicating the range to a target and to missiles in the beam.

4. In a missile in flight indicator, a radar transmitting a guidance beam including a guidance code comprising pulse groups, means in a missile traveling the beam for receiving and decoding the guidance code, a transponder in the missile and connected with the first-mentioned means and operable for recoding and retransmitting the guidance code, means remote from the missile for receiving and decoding the retransmitted code, counting and range indicating units connected to the last mentioned means, and means supplying target and missile position information from the radar to the counting and range indicating units.

5. Apparatus as recited in claim 4, wherein the first-mentioned means comprises an antenna, a guidance receiver connected to the antenna, a tapped delay line connected to the receiver, and a pulse decoder connected to the tapped delay line.

6. Apparatus as recited in claim 5, wherein the transponder includes a fixed delay line receiving pulse groups from the tapped delay line, a gate connected to the decoder, a pulse modulator connected to the fixed delay line and to the gate, and a pulsed oscillator connected to the modulator.

7. Apparatus as recited in claim 6, including additionally a second antenna on the missile and connected with the pulsed oscillator for radiating the retransmitted guidance code.

8. A missile in flight indicator including, in combination with a radar transmitting a beam including coded pulse groups, a missile in the beam and having means for receiving and retransmitting the coded pulse groups, means remote from the missile for receiving and decoding the retransmitted pulse groups, and means connected to said last-mentioned means and synchronized with the radar for providing a visual indication of the range of the missile in the beam and the distance from the missile to a target in the beam.

References Cited by the Examiner
UNITED STATES PATENTS

| | | | |
|---|---|---|---|
| 2,595,358 | 5/52 | Herbst | 343—6 |
| 2,703,399 | 3/55 | Williams | 244—14 |
| 2,857,592 | 10/58 | Hoffman | 343—13 X |

SAMUEL FEINBERG, *Primary Examiner.*

NORMAN H. EVANS, *Examiner.*